(12) United States Patent
Lacas et al.

(10) Patent No.: US 10,608,917 B2
(45) Date of Patent: *Mar. 31, 2020

(54) SYSTEM AND METHOD FOR CONTENT DELIVERY AND PRESENTATION

(71) Applicant: MediaFolio Technologies, Inc., Seattle, WA (US)

(72) Inventors: Mark Alan Lacas, Seattle, WA (US); Christopher Michael Dodge, Kirkland, WA (US)

(73) Assignee: MediaFolio Technologies, Inc., Seattle, WA (US)

( * ) Notice: Subject to any disclaimer, the term of this patent is extended or adjusted under 35 U.S.C. 154(b) by 189 days.

This patent is subject to a terminal disclaimer.

(21) Appl. No.: 14/997,097

(22) Filed: Jan. 15, 2016

(65) Prior Publication Data

US 2016/0212238 A1    Jul. 21, 2016

Related U.S. Application Data

(60) Provisional application No. 62/104,003, filed on Jan. 15, 2015.

(51) Int. Cl.
*H04W 4/18* (2009.01)
*H04L 12/26* (2006.01)
(Continued)

(52) U.S. Cl.
CPC .......... *H04L 43/10* (2013.01); *G06F 21/6218* (2013.01); *H04L 63/102* (2013.01); *H04L 67/34* (2013.01)

(58) Field of Classification Search
CPC ........................................................ H04L 67/32
(Continued)

(56) References Cited

U.S. PATENT DOCUMENTS 5,845,065 A    12/1998   Conte et al.
7,409,536 B2    8/2008   Guo et al.
(Continued)

OTHER PUBLICATIONS

Office Action dated Oct. 4, 2017, U.S. Appl. No. 14/997,158, filed Jan. 15, 2016.
(Continued)

*Primary Examiner* — Vivek Srivastava
*Assistant Examiner* — Sibte H Bukhari
(74) *Attorney, Agent, or Firm* — FisherBroyles LLP; Kevin D. Jablonski

(57) ABSTRACT

A system and method for content delivery and presentation at remote devices. The content may be presented in the form of objects in a workspace of a folio created by one or more content managers. The content manager may then allow authorized users to access or download the workspace through various user devices having browser-based web services or applications executing thereon. Further, the content manager may assign conditional operating parameters to each object or set of objects such that only specific users have access or an ability to download the object or the application for interacting with the object. Further yet, the content manager may specify relationships between objects such that users may only use or download the objects in a specific order. The content manager may have several other levels of control of the sets of objects and the objects in the workspace.

18 Claims, 5 Drawing Sheets

(51) Int. Cl.
*H04L 29/06* (2006.01)
*G06F 21/62* (2013.01)
*H04L 29/08* (2006.01)

(58) Field of Classification Search
USPC .......................................................... 709/219
See application file for complete search history.

(56) References Cited

U.S. PATENT DOCUMENTS

| | | |
|---|---|---|
| 8,429,540 B1 * | 4/2013 | Yankovich ............ G06F 9/4451 |
| | | 709/204 |
| 9,110,732 B1 | 8/2015 | Forschmiedt et al. |
| 9,549,038 B1 | 1/2017 | Anne et al. |
| 9,609,371 B2 | 3/2017 | Liang et al. |
| 9,692,841 B1 * | 6/2017 | Chandler ................. H04L 67/10 |
| 2005/0204126 A1 | 9/2005 | Watson |
| 2007/0204078 A1 | 8/2007 | Baccon-Gibod et al. |
| 2009/0164994 A1 | 6/2009 | Vasilevsky et al. |
| 2010/0180201 A1 | 7/2010 | Gibby et al. |
| 2012/0042036 A1 | 2/2012 | Lau et al. |
| 2012/0209686 A1 | 8/2012 | Horowitz et al. |
| 2015/0160951 A1 | 6/2015 | Iyengar et al. |
| 2016/0035007 A1 | 2/2016 | Taylor |
| 2016/0036963 A1 | 2/2016 | Lee et al. |
| 2016/0071198 A1 | 3/2016 | Rampata et al. |
| 2016/0098285 A1 | 4/2016 | Davis et al. |
| 2016/0164880 A1 * | 6/2016 | Colesa .................. H04L 63/105 |
| | | 726/1 |

OTHER PUBLICATIONS

Offic Action dated Oct. 3, 2017; U.S. Appl. No. 14/997,201, filed Jan. 15, 2016.

\* cited by examiner

SYSTEM AND METHOD FOR CONTENT DELIVERY AND PRESENTATION

PRIORITY CLAIM

This application claims the benefit of U.S. Provisional Application No. 62/104,003, entitled "System and Methods for Content Delivery and Presentation," filed Jan. 15, 2015, which is incorporated by reference in its entirety herein for all purposes.

RELATED APPLICATION DATA

The present application is related to U.S. patent application Ser. No. 14/997,158, entitled SYSTEM AND METHOD FOR CYCLING CACHED OBJECTS filed Jan. 15, 2016; and is related to U.S. patent application Ser. No. 14/997,201, entitled SYSTEM AND METHOD FOR AN INSTANTIABLE OPERATING SYSTEM WITH A CONTENT DELIVERY AND PRESENTATION SYSTEM filed Jan. 15, 2016, all of the foregoing applications are incorporated herein by reference in their entireties.

BACKGROUND

The internet and the internet of things provides a myriad of computing devices by which people can use, access, share, download, copy, consume, modify, and discuss content and applications that are also often stored across a great number of different repositories. Some applications provide a means by which a person may collect content in one repository either via establishing an actual content copy or a link to the actual content copy. Further, such a person may establish a relationship to another person with whom content can be shared through various means including by access to the repository of content such that both people can use, access, download, copy, consume, modify, and discuss the content.

However, once access is granted to the second person, the second person can edit, remove, destroy, ignore or otherwise control the content therein. The initial person does not have very much control over how and when the second person views or uses the content.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

Note that the same numbers are used throughout the disclosure and figures to reference like components and features.

DETAILED DESCRIPTION

Figure 1:
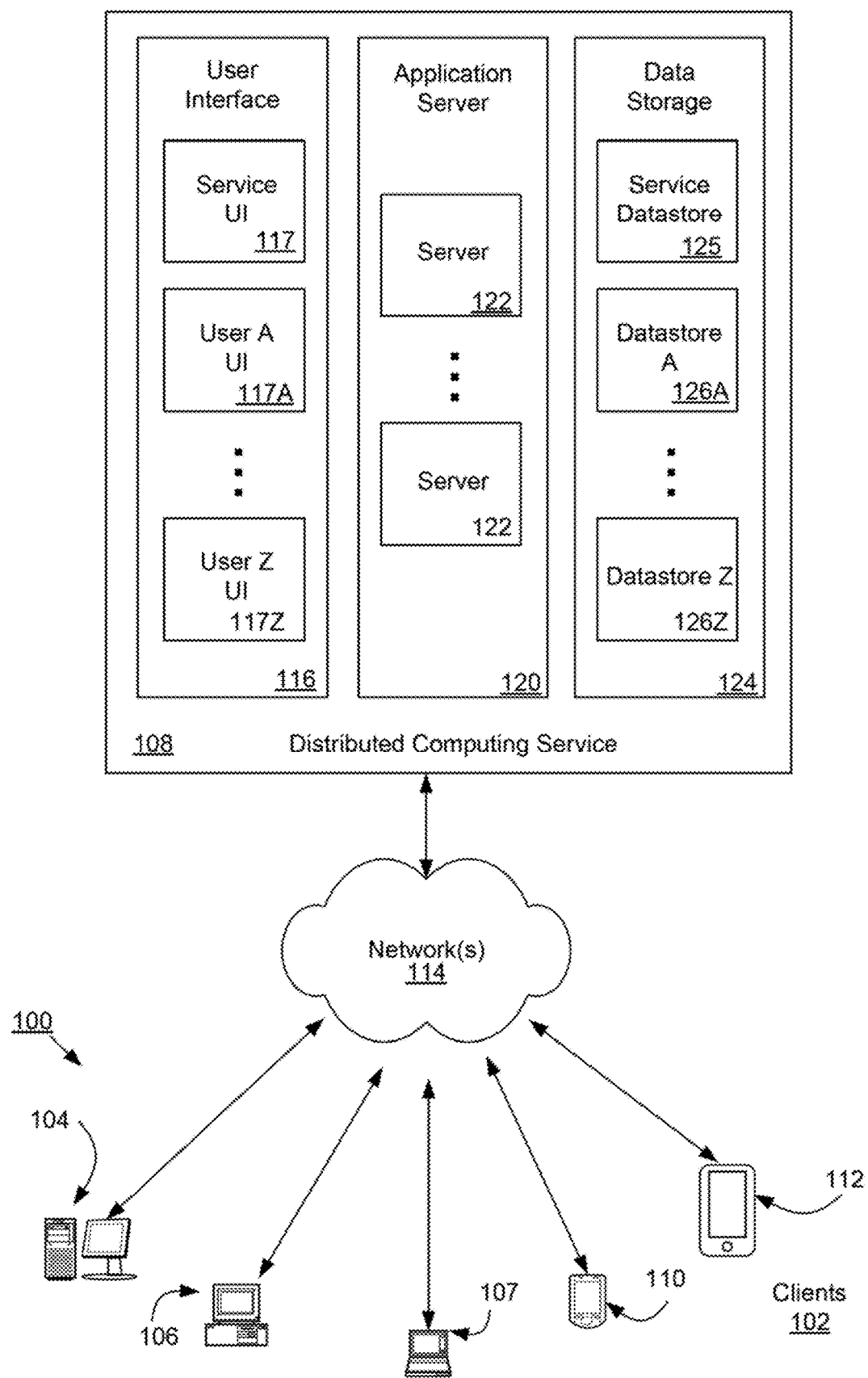
FIG. 1 is a diagram of a suitable computing network for practicing various aspects of a content management system and method according to an embodiment of the subject matter disclosed herein.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, aspects may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, or the like) that is part of a client device, server, or other form of computing device and that is programmed with a set of executable instructions (e.g., software instructions), where the instructions may be stored in a suitable data storage element or any non-transitory computer-readable medium. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

By way of overview, the subject matter disclosed herein may be directed to a system and method for content delivery and presentation. The content may be presented in the form of objects in a workspace of a folio created by a content manager. The content manager may further invite other users to collaborate as additional content managers and/or re-assign ownership of the folio, i.e., an individual responsible as content manager. The content manager may then allow authorized users to access or download the workspace through various user devices having browser-based web services or applications executing thereon. Further, the content manager may assign conditional operating parameters to each object or set of objects such that only specific users have access or an ability to download the object or the application for interacting with the object. Additional conditional operating parameters may also include download permissions, editing permissions, hidden or visible status, and other aspects of file management. Further yet, the content manager may specify relationships between objects such that users may only use or download the objects in a specific order. The content manager may have several other levels of control of the sets of objects and the objects in the workspace.

With such a folio of objects in place, a content manager may solve the problem of conditional access to objects by various users (or set of users, such as organizations, groups, and entities) based on a relationship to the object, the folio, other users. Other user's action, the user's actions, and time. Thus, one purpose of the subject matter disclosed herein is to provide a content manager with several levels of control over content being disseminated to several users across several devices. These and other aspects are better understood with respect to the description associated FIGS. 1-5 in the following paragraphs.

FIG. 1 illustrates an exemplary architecture of a networked computer system in which aspects of the system and applications described herein as may be practiced. Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

In some embodiments, the subject matter disclosed herein may be implemented in the context of a multi-user, "cloud" based environment, typically used to develop and provide web services for content managers and end users. Note that embodiments may also be implemented in the context of other computing or operational environments or systems, such as for an individual business data processing system, a remote or on-site data processing system, other form of client-server architecture, and the like.

In FIG. 1, a server computer 108 is shown with various computing objects that include at least an example operating environment 100 which, in turn, includes a variety of clients 102 incorporating and/or incorporated into a variety of computing devices that may communicate with a distributed computing platform 108 through one or more networks 114. For example, a user may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing platform 108 may include multiple processing levels, including a user interface level 116, an application server level 120, and a data storage level 124. The user interface tier 116 may maintain multiple user interfaces 117a-117x, including graphical user interfaces and/or web-based interfaces and/or application programming interface. As discussed further below, the user interfaces may be provided to various users in the form of a folio application having content managed therein. The user interfaces may include a default user interface for the service to provide access to applications and data for a user or "tenant" of the service, as well as one or more user interfaces that have been specialized/customized in accordance with user specific requirements (e.g., represented by "User A", . . . , "User Z" in the figure, and which may be accessed via one or more APIs). The default user interface may include components enabling a user to administer the user's participation in the functions and capabilities provided by the platform, such as accessing data and objects, causing the execution of specific data processing operations, and the like. Each processing level shown in FIG. 1 may be implemented with a set of computers and/or computer components including computer servers and processors, and may perform various functions, methods, processes, or operations as determined by the execution of a software application or set of instructions. The data storage level 124 may include one or more data stores, which may include a service data store 125 and one or more user data stores 126a-126x. Each data store 126a-126x may correspond to one or more folios, each having a manifest, which is discussed further below with respect to a folio in FIG. 2.

Each user data store 126 may contain user-specific data and content that is used as part of providing a range of user-specific business content, services, or functions. In accordance with one embodiment, the distributed computing platform 108 may be a multi-user and service platform 108 and may be operated by an entity in order to provide multiple users with a set of business related content, applications, data storage, and functionality. These applications and functionality may include ones that a business uses to educate and inform users in an organization, both on the employee side of the business as well as customer-facing solutions and content. For example, the applications and functionality may include providing web-based access to specific content, thereby allowing a user with a browser and an Internet or intranet connection to view, enter, process, or modify certain types of content and media. Further, the application and functionality may also include offline storage and use of data via plugins or other local applications.

The integrated business system shown in FIG. 1 may be hosted on a distributed computing system made up of at least one, but typically multiple, "servers." A server 108 is a physical computer dedicated to run one or more software services intended to serve the needs of the users of other computers in data communication with the server, for instance via a public network such as the Internet or a private "intranet" network. The server 108, and the services it provides, may be referred to as the "host" and the remote computers and the software applications running on the remote computers may be referred to as the "users" or "clients." Depending on the computing service that a server offers it could be referred to as a database server, file server, mail server, print server, web server, and the like. A web server is a most often a combination of hardware and the software that helps deliver content (typically by hosting a website) to client web browsers that access the web server via the Internet.

FIG. 1 is a diagram illustrating details of the elements or components of the distributed computing platform in which an embodiment may be implemented. The software architecture depicted in FIG. 1 represents an example of a complex software system to which an embodiment may be applied. In general, an embodiment may be applied to any set of software instructions embodied in one or more non-transitory, computer-readable media that are designed to be executed by a suitably programmed processing element (such as a CPU, microprocessor, processor, controller, computing device, and the like). In a complex system, such instructions are typically arranged into "modules" (sometimes called services) with each such module performing a specific task, process, function, or operation. The entire set of modules may be controlled or coordinated in their operation by an operating system (OS) or other form of organizational platform.

Note that the example computing environments depicted in FIG. 1 are not intended to be limiting examples. Alternatively, or in addition, computing environments in which embodiments may be implemented include any suitable system that permits users to access, process, and utilize content and data stored in a data storage element (e.g., a database) that can be accessed remotely over a network. Although further examples below may reference the example computing environment depicted in FIG. 1, it will be apparent to one of skill in the art that the examples may be adapted for alternate computing devices, systems, and environments.

Figure 2:
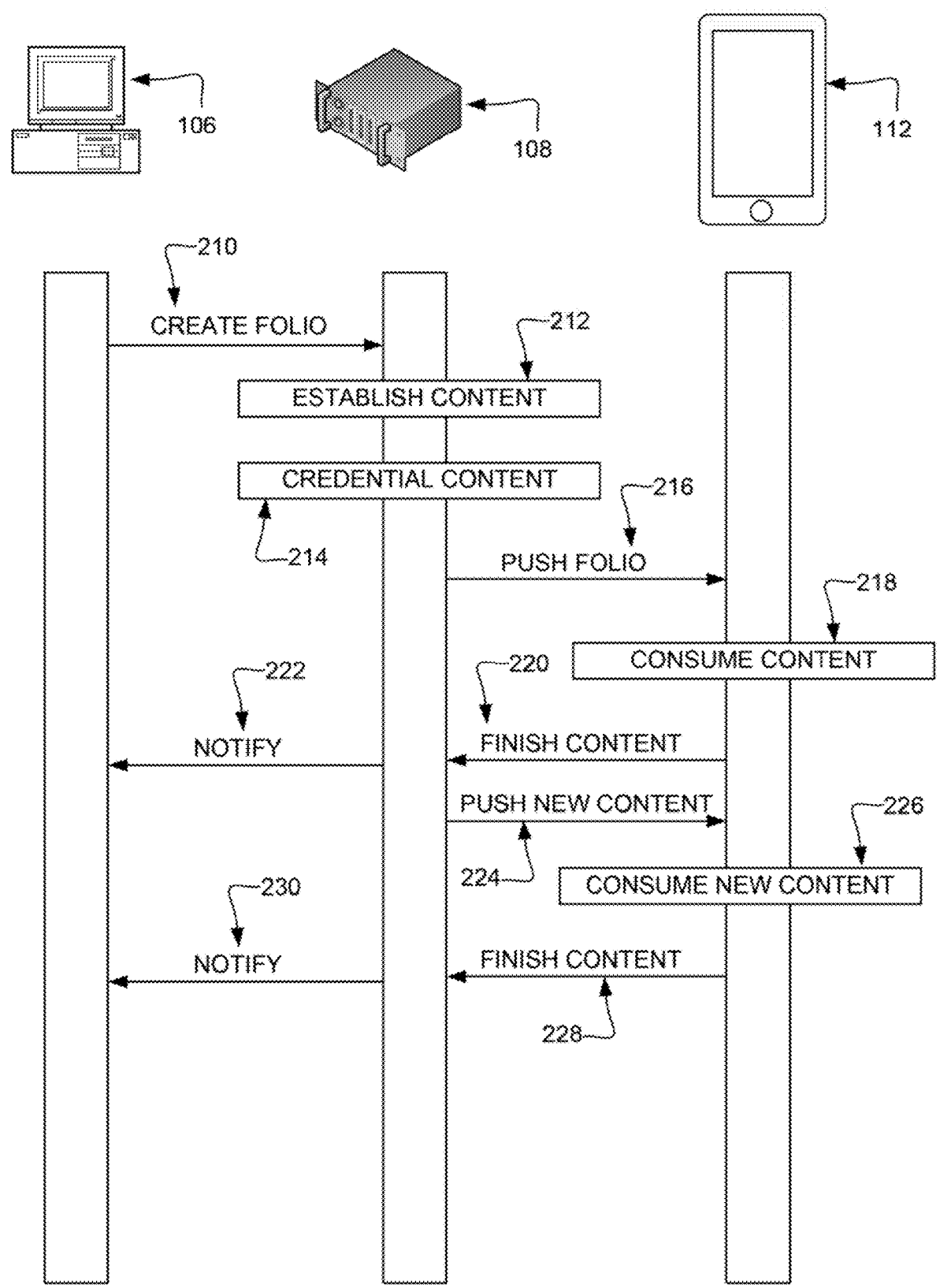
FIG. 2 is a diagram of aspects of the computer network of FIG. 1 showing a functional flow of operations according to an embodiment of the subject matter disclosed herein.

FIG. 2 is a diagram of aspects of the computer network of FIG. 1 showing a functional flow of operations according to an embodiment of the subject matter disclosed herein. The functional flow may encompass operations between two or more computing entities in a networked or cloud-based computing environment or may encompass activity solely within a single computing entity. As such, the steps and or operations described with respect to FIG. 2 are but one possible way in which the systems and methods discussed herein may be embodied.

To invoke the various systems and methods described herein, a manager of content (e.g., a content creator, business manager, supervisor, trainer, subject matter expert, and the like) may establish a folio for handling various objects having content for viewing, execution, or use by users of such content. The folio (sometimes called a MediaFolio™) is a content presentation and delivery software-based mechanism that facilitates sharing content, instructions, and information with employees, customers, and other audiences in a private, branded, experience. The folio may be created using a first application, such as a FolioComposer™, that may be executing on a first computing device, such as a content manager desktop computer 106. Through a composition application, a content manager may use a pre-defined template or establish a unique folio that includes information, content, and branding that is focused on a specific audience, such as employees, customers, guests, management, and the like. Typically, the breadth of this data that is stored in the context of a folio may be referred to as a manifest. With the manifest, the underlying data may be saved into specific formats for use across many devices as .folio files, .zip files, .pdf files, and the like. As a folio is created, the content manager may draw content and information from a local memory (local to the desktop computer 106) or from a server computer 108. Further, the application may be executed locally at the desktop computer 106 or may be executed at the server computer 108 while being manipulated remotely (via a browser-based application) from the desktop computer 106. For the purposes of this example, the execution of the creation application is shown as being at the server computer with control by a client computer 106. Further, the content itself may reside on any computing device that may be communicatively coupled to the client computer 106 and/or the server computer 108.

At 212, the content may be added to the folio in the form of objects. In this context, the content or objects may refer to commonly used computer files having information, data, and/or media. Such common examples of objects to be placed in a folio include audio files, such as .mp3, .wav, .m4p, .wma, and the like, document files, such as .doc, .pdf, .txt and the like, video files such as .mov, .avi, .mpeg and the like, image files such as .gif, .png, .jpg, .tiff, and the like and other multimedia file types such as .ppt and the like. In short, any file type of computer file may be used to populate a folio for use by users of the folio including smart objects, executable objects, embedded applications, live objects, or any other computer-executable set of instructions that are grouped together as an object.

The content manager may coordinate additional decisions with regard to the content presentation such as images (for background, headers, icons representing files), colors, fonts, icon placement order, location in the folio, icon representation, naming, labeling, and other conditional parameters for execution, consumption, manipulation, and deletion. That is, the content manager may configure each object in the folio to have one or more conditional operating parameters or conditional execution parameters at 214.

In a first example of a conditional operating parameter, the content manager may configure an object to include a condition for execution predicated upon the credentials of a user attempting to execute the object. That is, the object, such as a video file, may be configured to only be executable by a specific user or set of users. At a user device, the user may be categorized into a specific group or user setting when a folio is downloaded. Based on how the user is categorized, specific execution condition parameters for various files may or may not be met. If the condition is met based upon a category of a user, then the object may be able to be executed. For example, a content manager may place a condition on an object such that the object is only executable to users categorized as employee while other users (such as contractors, customers, or any other kind of user designation) will be unable to execute (or even view) the object from the folio.

Another example of a conditional operating parameter includes a condition for execution predicated upon the execution of at least one different content object prior to enabling execution of the at least one content object. Another example of a conditional operating parameter includes a condition for execution predicated upon the execution of the at least one content object by at least one different user. Another example of a conditional operating parameter includes a condition for execution predicated upon a timeframe. These conditions are discussed in greater detail below with respect to FIG. 4.

Once the folio has been created and desired objects have conditional operating parameters established according to the desires of the content manager, the folio may be sent to folio users at a respective folio user device 112 at 216. The folio user device 112 may be a portable computing device such as a tablet computer, a laptop computer, a smartphone, a smart tablet, and the like. In one embodiment, the folio is sent to each configured device 112 in a push format. That is, when the folio is ready or updated, the folio is automatically sent to each configured device 112 without a prompting from each device 112. In other embodiments, the folio may be downloaded proactively from a cloud computing environment to the device 112.

Once downloaded at the user device 112, the user device may already include a local application executable at the local device 112. The local application may be called the MediaFolio application and provides a platform for receiving and displaying a folio as prepared by a content manager.

The MediaFolio application may be executable in the context of a local operating system (sometimes called a "personal use" embodiment) or may supplant some or all aspects of the local operating system (sometimes called a "managed device" embodiment) such that only manipulation functions through the MediaFolio application are available. Through the MediaFolio application, the user may execute and consume the various objects available in the folio at 218 (assuming the conditions of the conditional operating parameters are satisfied or met). Additional control parameters may be used, such as establishing password or pin in order to wake the device or execute the MediaFolio application.

At 220, as content is consumed, various communications may be made back to the server computer 108 indicating the consumption of content. This in turn may effect a notification to the content manager at 222 or may engage additional chat functionality or analytics. If other objects in the folio have a condition predicated upon consumption of other objects, the condition may be met as the user consumes content of the initial object or conditioned object. As a result, objects already downloaded may be "unlocked" for consumption. In other embodiments, the consumption of initial objects may trigger the download of new objects at 224. This assists with keeping certain content off of or locked within devices with limited memory space until the object are to be used. An example of this may be a series of training videos that should be viewed in order, whereby the next video in a series is only downloaded once a user has consumed (e.g., watched) the first video. This process may be repeated often as a user consumes the newly pushed content at 226 and triggers communications to the server at 228 and notification to the content manager at 230.

In general, the computing environments of FIGS. 1-2 provide a cloud-based computing environment in which an end user of content management and delivery system and method may manage content with a great amount of control over how and when content in a managed folio is consumed and control over who consumes such content. The control mechanism for a content manager is realized through a MediaFolio application executing at the local user device. Aspects of the MediaFolio application are discussed next with respect to FIG. 3.

Figure 3:
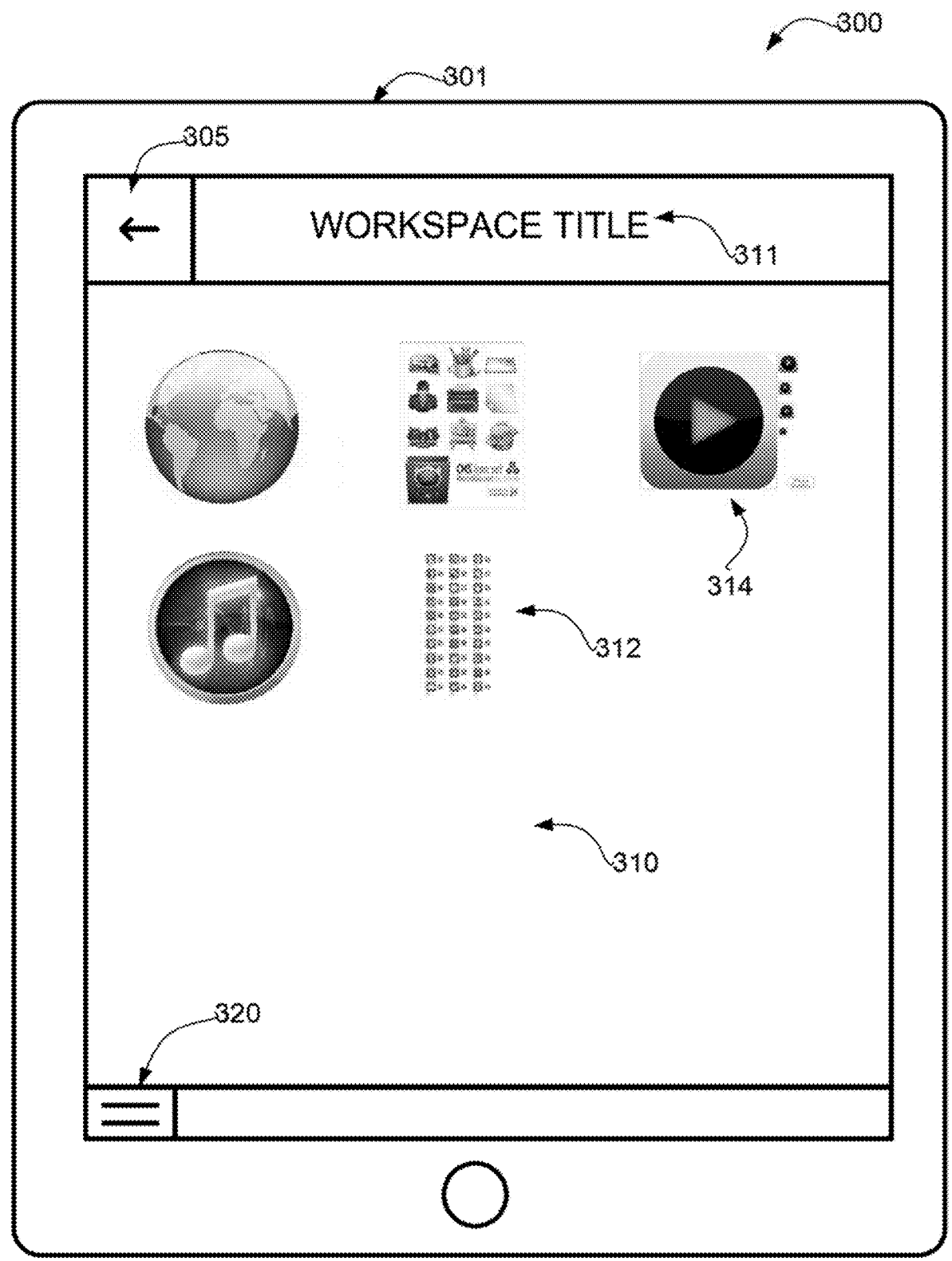
FIG. 3 shows an example screen shot of a folio space according to an embodiment of the subject matter disclosed herein.

FIG. 3 shows an example screen shot 300 of a folio according to an embodiment of the subject matter disclosed herein. A content manager may create the folio having a workspace 310 (sometimes called a section) having a workspace title 311. This workspace 310 serves as a repository for objects having content that the content manager wishes to disseminate to authorized users or groups. The workspace 310 may include additional sections to further sort or categorize objects. This workspace may include a title 311 or any kind of branding information (e.g., company names, logos, images, colors, font styles, and the like). The workspace 310 may be created on a local device, such as the content manager's computer 106 of FIG. 2, and shared in the cloud with a physical presence at a server computer, such as server computer 108 of FIG. 2, within the computing environment as discussed above or sent in its entirety to other user(s). A workspace 310 may be saved into a single file such as into a .folio format and shared directly to a user computer, such as client device 112 of FIG. 2, or posted to a third party cloud (i.e., Dropbox™) or to a remote server computer, rather than just served through a cloud service.

The workspace 310 may be part of an overall web-based service or device application for managing and presenting content as discussed above. That is, the overall computing system may include a first computer for creating and generating the folio using a FolioComposer application and then shared and used by other computing devices using the local MediaFolio application. For example, either application may be part of a web-based service application that is accessed through a computer executing a web browser or be a native application on that computer's platform. Further, the workspace 310 may be part of a dedicated application that executes on one or more computing devices. Further yet, objects, content, and executables may be served to each user device via a networked environment via cloud services.

These applications may have additional control elements that are accessible on different aspects of the overall application. Such additional menus and tools may be accessed, in this embodiment, via an initial workspace construction page (which workspace owners and authorized users can open a workspace to edit via an edit button not shown here). Further menus may be accessed via soft button, long presses, control clicks, or similar means 320.

The workspace 310 may be populated with objects, such as objects 312 and 314. These objects may be any object that may be created in computing in general. Each object may include a number of properties, values, and routines associated with individual users, underlying content, executable instructions, application links, and the like. The objects may be associated with specific underlying content, such as a video file, such that additional aspects of the object may also then determine additional details for use, such as users who may have permission to use the object, which application should render the content, and the like. Each object may be configured with conditional operating parameters as discussed above.

Once objects are present in the workspace 310, the content manager and any other users (who have proper permissions, as discussed further below) may then see the objects in the workspace 310. Permissions may be granted at a workspace/folio level as well. Further yet, permissions may grant access to encrypted filed or unlock additional actions such as copying or moving files. Without proper permissions of each kind, a user may not be able to interact with objects because of encryption or may not have the ability to copy or move objects.

One conditional operating parameter that may be defined is user permission for a number of different actions. For example, the content manager may define a condition as a permission to even access the workspace 310 let alone see any object in the workspace 310 by defining global workspace permission for users. Similarly, the content manager may define a condition for permission on an object-by-object basis and on a user-by-user basis such that each individual object with respect to each individual user includes defined permissive relationship in the form of a conditional operating parameter.

Another conditional operating parameter that may be defined is a condition for an application link. The content manager may define an executable application that is linked to the object. Further, the object itself may, in fact, be an executable application. Invocation of such an object may then follow the defined linked application relationship.

Another conditional operating parameter that may be defined is a condition for a relationship with another object. Thus, a content manager may define a hierarchical order in which objects may be presented, invoked, downloaded, or consumed. For example, a series of instructional videos may need to be viewed in order. Thus, a second video object may be disabled until a first video object is instantiated and rendered in its entirety. Thus, the second video object may include a conditional operating parameter based on the condition of the playback of a first video object. Further, the second video object may not even be visible until after rendering the first video object. Object downloads may also be triggered by actions of a first object via defined transactional relationships.

Another conditional operating parameter that may be defined is a condition for a relationship with another workspace or folio. Thus, a content manager may define a hierarchical order in which objects may be presented, invoked, downloaded, or consumed in relation to other workspace or folio uses. For example, folios associated with a boss may have object that, after being viewed, trigger a download to all employees' folios. This may be useful for an organization to disseminate information to management prior to letting staff know about an announcement.

Another conditional operating parameter that may be defined is a relationship with another user. Similar to above where an object may have defined relationships to other objects, such as a hierarchical relationship, may also be arranged by user. Thus, a first group of users (for example, workers on floor 42) may need to first complete a viewing of a video object before a second group of users (for example, workers on floor 43) can begin viewing the video object.

Further, access to the workspace 310 may be set by the content manager for any additional user or group including whether the user has editable access or simply view access in the workspace or other levels of access. Further yet, the content manager may set a perishable time and date for workspaces and all content and may set whether cached copies are moved in or out of the physical device of the user or not. The interface is a customizable and brandable presentation of one or more workspaces and may draw content from multiple external content sources. Workspaces can be organized into named and branded sections. The objects in the workspace's sections may be presented in a selectable order and may be selectively enabled for execution only in the selected order. The workspace may also be delivered as a self-contained package that also permits offline viewing.

Figure 4:
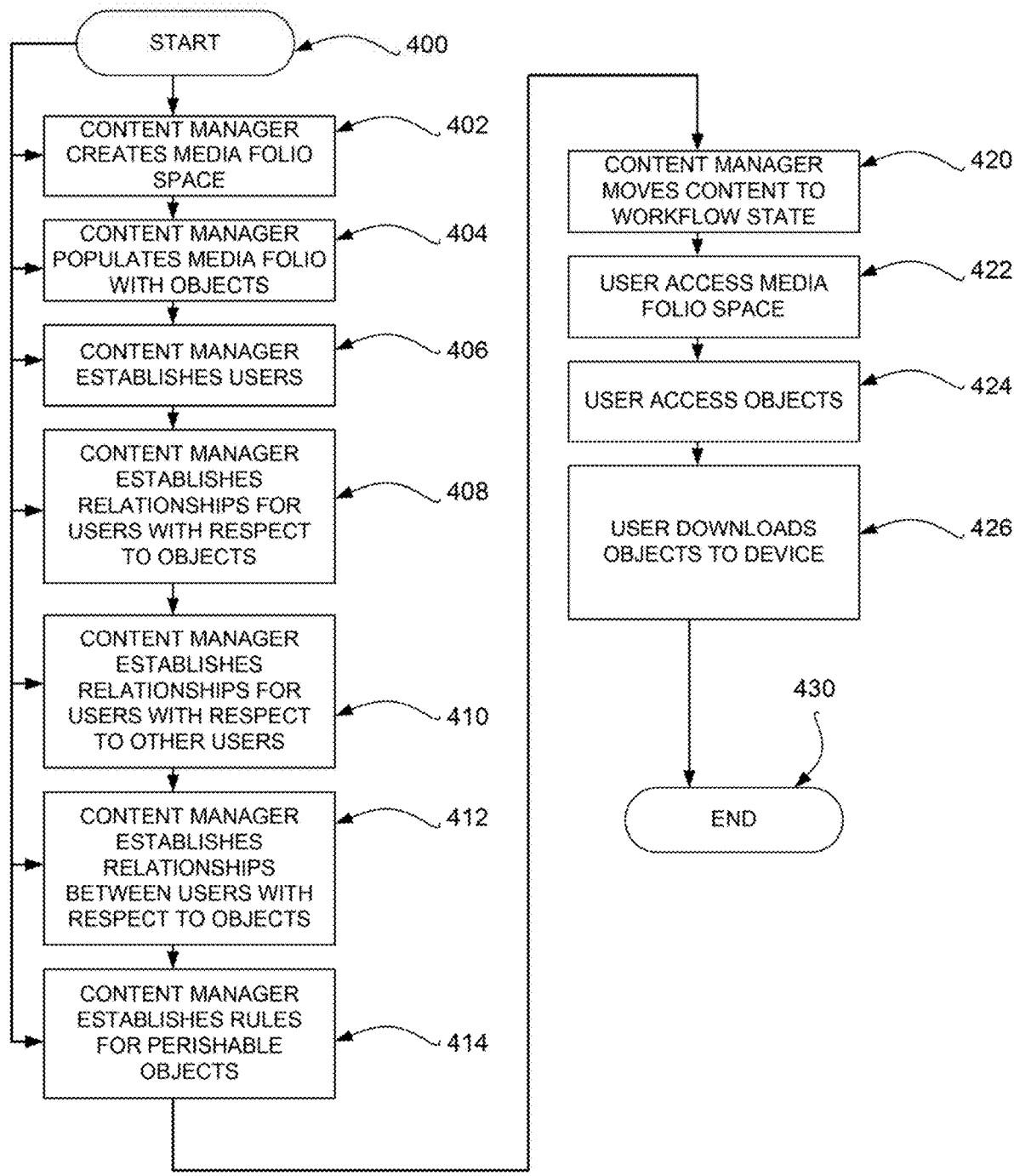
FIG. 4 shows a flow chart of a method for creating and using a folio according to an embodiment of the subject matter disclosed herein.

FIG. 4 shows a flow chart of a method for creating and using a folio workspace according to an embodiment of the subject matter disclosed herein. In this method, a content manager may create, edit, distribute, and use a folio workspace having many different objects having differing characteristics and discussed above. In this embodiment, the method may begin at step 400 and proceed to step 402 where a content manager may create a new folio workspace within a web browser, dedicated application, programmatically, or combination thereof.

Once an initial workspace is created, the content manager may then begin populating the various sections with various objects at step 404 and optionally authorize specific others to collaborate as content managers too within that folio. As discussed above, the objects may be media objects such as audio or video files and the like. Further, the objects may be document objects such as word processing documents, spreadsheets, databases, and the like. Further yet, the objects may be executable files that may be invoked to execute instantiable applications or launch a web-based service.

At step 406, either after, before, or concurrent with populating the workspace with objects, the content manager or other authorized users may establish users who will have at least some access to the workspace, its sections, and/or its objects. Here, the content manager may define conditional operating parameters on a user-by-user or group basis for all content in the workspace. Such conditional operating parameters may be initially set to a sharing permission at the workspace level. Other conditional operating parameters may include permissions at the section or object level. Further, the content manager will be able to sunrise/sunset access to the workspace as yet another conditional operating parameters.

At step 410, either after, before, or concurrent with populating the workspace with objects, the content manager or other authorized users may establish relationships for users with respect to the workspace, its sections, and or its objects. Here the content manager may define a conditional operating parameter regarding relationships on a user-by-user basis for all content in the workspace in relation to the other users.

At step 412, either after, before, or concurrent with populating the workspace with objects, the content manager or other authorized users may establish relationships between users with respect to the workspace, its sections, and or its objects. Here, the content manager may define a conditional operating parameter regarding relationships on a user-by-user or group basis for all content in the workspace in relation to the other users.

At step 414, either after, before, or concurrent with populating the workspace with objects, the content manager or other authorized users may establish relationships for time or use with respect to the workspace, its sections, and or its objects. Here, authorized users may define a conditional operating parameter for an expiration date or time or an expiration event.

At step 420, either after, before, or concurrent with populating the workspace with objects, the content manager or other authorized users may move the content in the folio to a workflow state whereby additional users may now access the workspace. The access may include editing permissions, copying permissions, downloading permissions, chat permissions, and the like.

Once a user has access of some kind, a user may view the objects in the workspace at step 422, or access objects at step 424, or download objects at step 426 depending on the permission established by the content manager.

Any of these steps may be performed in any order as the layout of the flowchart is but one example embodiment of a method described herein.

Figure 5:
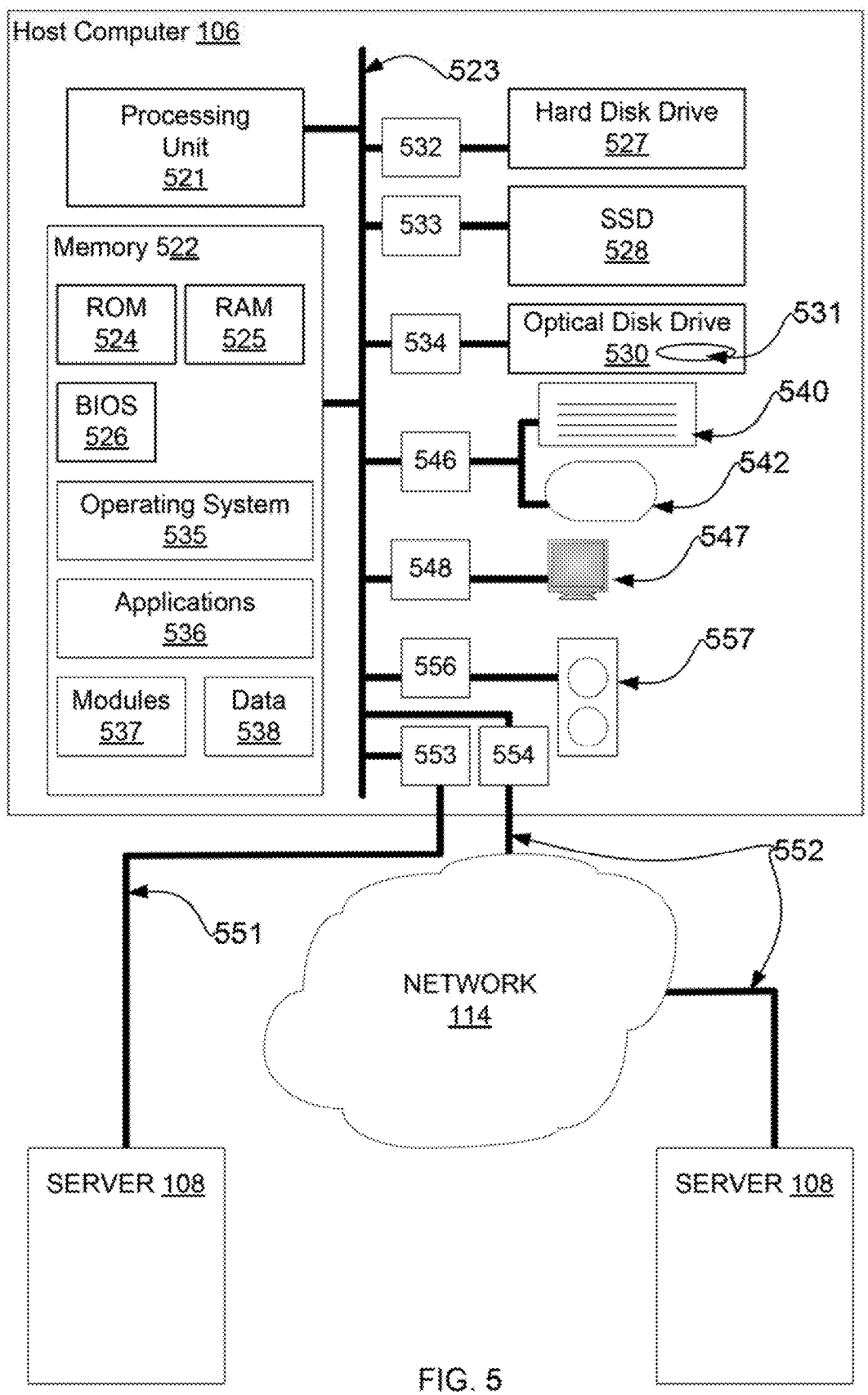
FIG. 5 is a diagram of a suitable computing environment for practicing various aspects of the disclosed subject matter according to an embodiment of the subject matter disclosed herein.

FIG. 5 and the following discussion are intended to provide a brief, general description of a suitable computing environment in which the subject matter disclosed herein may be implemented. Although not required, aspects of the subject matter disclosed herein will be described in the general context of computer-executable instructions, such as program modules, being executed by a personal computer. Generally, program modules include routines, programs, objects, components, data structures, etc., that perform particular tasks or implement particular abstract data types. Such program module may be embodied in both a transitory and/or a non-transitory computer readable medium having computer-executable instructions. Moreover, those skilled in the art will appreciate that the invention may be practiced with other computer system configurations, including handheld devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that may be linked through a communications network. In a distributed computing environment, program modules may be located in both local and remote memory storage devices.

With reference to FIG. 5, an exemplary system for implementing the systems and methods disclosed herein includes a general purpose computing device in the form of a conventional personal computer 106, including a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory includes read only memory (ROM) 524 and random access memory (RAM) 525. A basic input/output system (BIOS) 526, containing the basic routines that help to transfer information between elements within the personal computer 520, such as during start-up, is stored in ROM 524. The personal computer 520 further includes a hard disk drive 527 for reading from and writing to a hard disk, not shown, a solid-state drive 528, and an optical disk drive 530 for reading from or writing to a removable optical disk 531 such as a CD ROM or other optical media. The hard disk drive 527, solid-state drive 528, and optical disk drive 530 are connected to the system bus 523 by a hard disk drive interface 532, a solid-state drive interface 533, and an optical drive interface 534, respectively. The drives and their associated computer-readable media provide nonvolatile storage of computer readable instructions, data structures, program modules and other data for the personal computer 520. Although the exemplary environment described herein employs a hard disk, a solid-state drive 528 and a removable optical disk 531, it should be appreciated by those skilled in the art that other types of computer-readable media which can store data that is accessible by a computer, such as thumb drives, random access memories (RAMs), read only memories (ROM), and the like, may also be used in the exemplary operating environment.

A number of program modules may be stored on the hard disk, solid-state drive 528, optical disk 531, ROM 524 or RAM 525, including an operating system 535, one or more application programs 536, other program modules 537, and program data 538. A user may enter commands and information into the personal computer or other computing devices (not shown) 520 through input devices such as a keyboard 540 and pointing device 542. Other input devices (not shown) may include a microphone, joystick, game pad, satellite dish, scanner, touch screen, or the like. These and other input devices are often connected to the processing unit 521 through a serial port interface 546 that is coupled to the system bus, but may be connected by other interfaces, such as a parallel port, game port or a universal serial bus (USB). A monitor or display screen 547 or other type of display device is also connected to the system bus 523 via an interface, such as a video adapter 548. One or more speakers 557 are also connected to the system bus 523 via an interface, such as an audio adapter 556. In addition to the monitor and speakers, personal computers typically include other peripheral output devices (not shown), such as printers.

The personal computer 520 may also operate in a networked environment using logical connections to one or more remote computers, such as remote servers. Each remote server 108 may be another personal computer, a server, a router, a network PC, a peer device or other common network node, and typically includes many or all of the elements described above relative to the personal computer 520. The logical connections depicted in FIG. 5 include a local area network (LAN) 551 and a wide area network (WAN) 552. Such networking environments are commonplace in offices, enterprise-wide computer networks, intranets and the Internet.

When used in a LAN networking environment, the personal computer 520 is connected to the local network 551 through a network interface or adapter 553. When used in a WAN networking environment, the personal computer 520 typically includes a modem 554 or other means for establishing communications over the wide area network 552, such as the Internet. The modem 554, which may be internal or external, is connected to the system bus 523. In a networked environment, program modules depicted relative to the personal computer 520, or portions thereof, may be stored in the remote memory storage device. It will be appreciated that the network connections shown are exemplary and other means of establishing a communications link between the computers may be used.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A computer-based method of providing content to a computing device, the method comprising:
    establishing a first folio for content at a folio server computer in a memory in the folio server computer;
    establishing a second folio in a memory of a remote device that is communicatively coupled to the folio server computer;
    populating the first folio with at least one content object;
    assigning the at least one content object a conditional operating parameter that is satisfiable only by a user of the remote device and predicated upon an allowed access time for enabling execution and a disallowed access time for disabling execution and predicated upon an execution status of a similar object in a third folio on a device different from the remote device such that the content object may not be executed unless a condition associated with the conditional operating parameter is met;
    downloading the at least one conditionally-executable content object to the second folio;
    executing the conditionally-executable content object at the remote device if the conditional operating parameter associated with the remote device is met by an action of the user of the remote device.

2. The computer-based method of claim 1, further comprising configuring the at least one conditional operating parameter as a condition for execution predicated upon the credentials of a user attempting to execute the object.

3. The computer-based method of claim 1, further comprising configuring the at least one conditional operating parameter as a condition for execution predicated upon the execution of at least one different content object prior to enabling execution of the at least one content object.

4. The computer-based method of claim 1, further comprising configuring the at least one conditional operating parameter as a condition for execution predicated upon the execution of the at least one content object by at least one different user.

5. The computer-based method of claim 1, further comprising configuring the at least one conditional operating parameter as a condition for execution predicated upon a timeframe.

6. The computer-based method of claim 1, further comprising executing the at least one object via a managed execution environment application configured to be populated with one or more objects via remote configuration.

7. The computer-based method of claim 1, further comprising:
monitoring the execution of the at least one object;
in response to the monitoring of the at least one object, triggering execution of at least one other object.

8. The computer-based method of claim 1, further comprising:
monitoring the execution of the at least one object;
in response to the monitoring of the at least one object, triggering retrieval of at least one other object.

9. The computer-based method of claim 1, wherein the content object comprises one from the group comprised of: a document file, an audio file, a video file, and audio-video file, a presentation file, a spreadsheet, and an image file.

10. A device, comprising:
a processor configured to execute computer instructions;
a memory coupled to the processor and configured to store the executable computer instructions; and
a folio established in the memory having an object area configured to host at least one conditionally-executable object;
wherein the at least one conditionally-executable object that is executable by the processor comprises a conditional operating parameter such that the at least one conditionally-executable object may not be executed by the processor unless a condition assigned to the conditional operating parameter is met by an executable action of the processor extraneous to the conditionally-executable object;
wherein the conditional operating parameter comprises a condition for execution predicated upon an allowed access time for enabling execution and a disallowed access time for disabling execution; and
wherein the conditional operating parameter comprises a condition for execution predicated upon an execution status of a similar object in a different folio on a different device.

11. The device of claim 10, wherein the device comprises a mobile computing device configured to be coupled to a wireless computer network.

12. The device of claim 10, wherein the device comprises an operating system that is configured to be superseded by a folio execution application.

13. The device of claim 10, wherein the device comprises an operating system that is configured to execute a folio execution application.

14. The device of claim 10, wherein the conditional operating parameter comprises a condition for execution predicated upon credentials of a user associated with the device that is attempting to execute the object.

15. The device of claim 10, wherein the conditional operating parameter comprises a condition for execution predicated upon the execution of at least one different content object prior to enabling execution of the at least one content object.

16. A computer-based method of providing content to a computing device, the method comprising:
a step for establishing a first folio for content at a folio server computer;
a step for populating the first folio with at least one content object;
a step for assigning the at least one content object a conditional operating parameter associated with a computing system other than the folio server computer such that the content object may not be executed unless a condition associated with the conditional operating parameter is met, the condition satisfiable exclusively by one and only one executable action and predicated upon an allowed access time for enabling execution and a disallowed access time for disabling execution and predicated upon an execution status of a similar object in a different folio on a different computing system;
a step for establishing a second folio at a remote device that is communicatively coupled to the folio server computer;
a step for downloading the at least one conditionally-executable content object to the second folio; and
a step for executing the conditionally-executable content object at the remote device if the conditional operating parameter associated with the remote device is met by an action of a processor associated with the remote device.

17. The computer-based method of claim 16, further comprising a step for configuring the at least one conditional operating parameter as a condition for execution predicated upon the credentials of a user attempting to execute the object.

18. The computer-based method of claim 16, further comprising:
a step for monitoring the execution of the at least one object; and
in response to the monitoring of the at least one object, a step for triggering retrieval of at least one other object.

* * * * *